United States Patent [19]

Nilsson

[11] 4,176,568

[45] Dec. 4, 1979

[54] BAND CUTTING APPARATUS

[75] Inventor: Erik G. Nilsson, Buchs, Switzerland

[73] Assignee: Swegea Maschinen AG, Buchs, Switzerland

[21] Appl. No.: 900,223

[22] Filed: Apr. 26, 1978

[30] Foreign Application Priority Data

Apr. 29, 1978 [AT] Austria ................................ 3069/78

[51] Int. Cl.[2] ................................................ B23D 19/04

[52] U.S. Cl. ........................................ 83/187; 83/425; 226/196; 83/449; 83/925 EB

[58] Field of Search ................. 83/187, 425, 443, 445, 83/446, 447, 448, 449, 925 EB; 226/196

[56] References Cited

FOREIGN PATENT DOCUMENTS

| | | |
|---|---|---|
| 12309 | 6/1903 | Austria . |
| 420388 | 10/1925 | Fed. Rep. of Germany . |
| 421257 | 11/1925 | Fed. Rep. of Germany . |

*Primary Examiner*—J. M. Meister
*Attorney, Agent, or Firm*—Lester Horwitz

[57] ABSTRACT

A band cutting apparatus for cutting a fabric web to produce a web-like article by the agency of a cutting means to which said fabric web is guided. There is provided a guide means including at least one fabric guide means provided with a flattening means for flattening an inwardly directed curl at the edge of said fabric. Said fabric guide means is arranged relative to the direction of advancement of said fabric web ahead of said cutting means.

10 Claims, 5 Drawing Figures

Fig.4
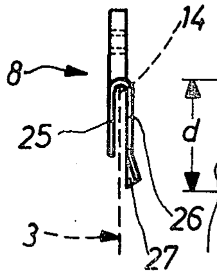
Fig.5
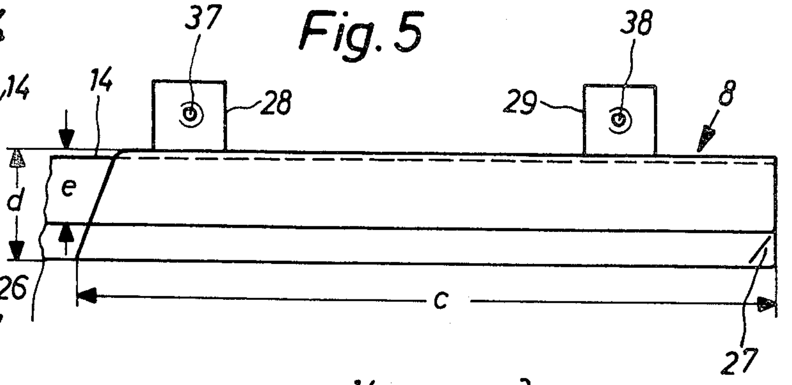
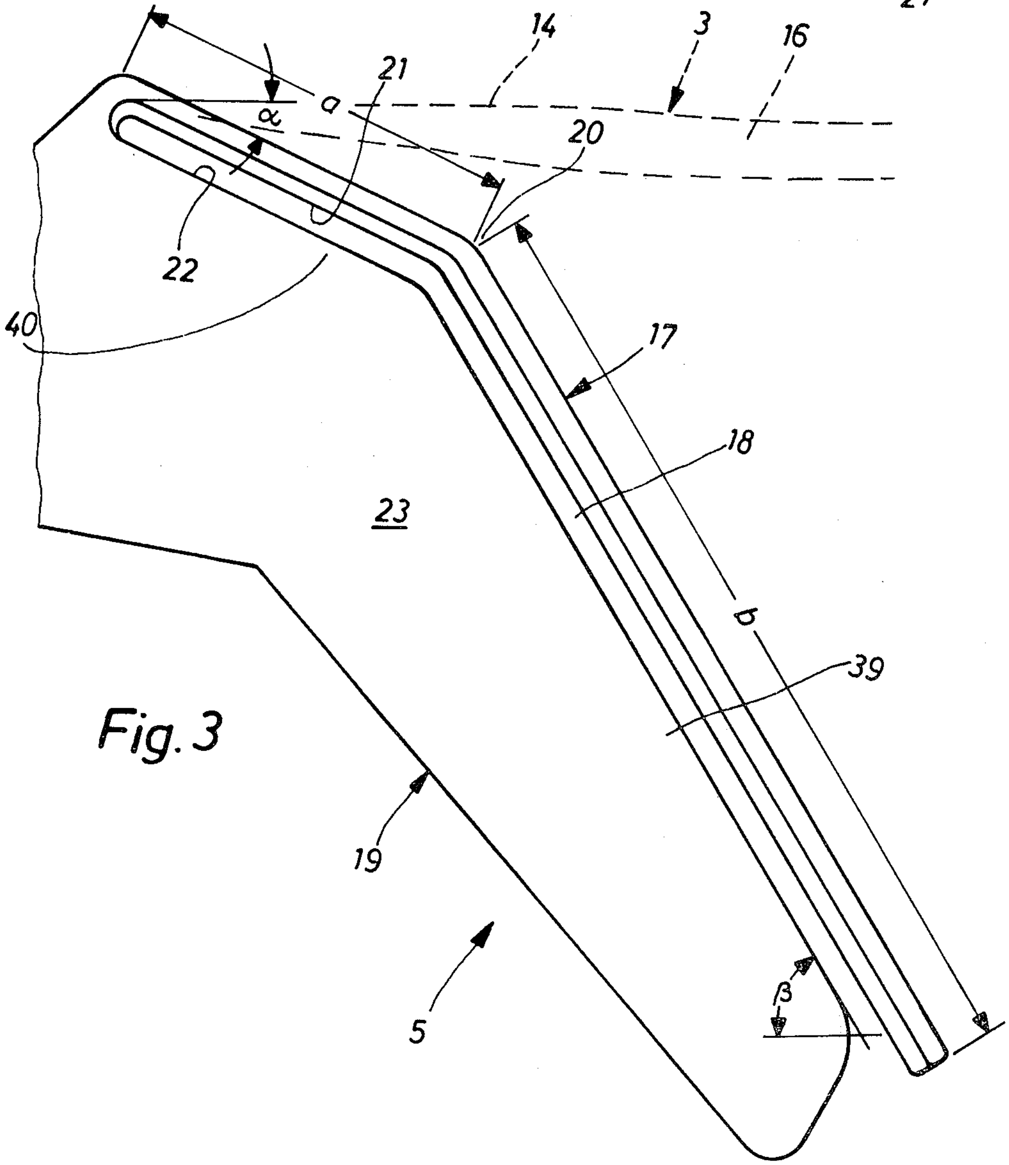
Fig.3

BAND CUTTING APPARATUS

BACKGROUND OF THE INVENTION

The present invention relates to a band cutting apparatus for cutting a fabric web to produce a web-like article by the agency of a cutting means, whereby said fabric web is guided towards said cutting means.

DESCRIPTION OF THE PRIOR ART

Such fabric webs consist generally of a knitted material, and the web-like articles are generally used for forming edge portions of clothing articles, specifically of underwear.

Prior art band cutting apparatus have produced web-like articles of varying width because a knitted fabric incorporates certain variations, such as e.g. a variation of its flexibility. It has been practice to simply accept such variation, whereby a certain unsatisfactory appearance has been accepted or then alternatively to cut the web somewhat broader than necessary, such that in order to cover said variations it was folded and sewed down. In the latter case a larger quantity of the fabric material than really necessary was used.

Jersey fabrics and sponge cloth have specifically a tendency to curl in along their side edges, and this also in a stretched condition of said fabric readied for cutting. This can obstruct the movement of advance of the fabric and furthermore negatively influence a cutting or producing, respectively, of a web having an uniform width.

SUMMARY OF THE INVENTION

A band cutting apparatus for cutting a fabric web to produce a web-like article by the agency of a cutting means, whereby said fabric web is guided towards said cutting means, comprising a guide means including at least one fabric guide means provided with a flattening means for flattening an inwardly directed curl at the edge of said fabric, which fabric guide means is arranged relative to the direction of advancement of said fabric web ahead of said cutting means.

An object of the invention is to provide a band cutting apparatus having a guide means for flattening out any curls extending along a side edge of a fabric web to be cut into a web-like article.

A further object is to provide a flattening means comprising a slot extending obliquely at an acute angle against the direction of advancement of the fabric web, through which slot the edge of the fabric web is guided to pass through said flattening means. In accordance with a preferred embodiment the slot separates a run-up flattening arm from a parallel thereto extending run-down flattening arm, whereby the latter comprises a flattening surface or plane extending in the plane defined by said fabric web. Preferably the flattening member and slot, respectively, comprise a first and a second section connected to each other by an angled section, whereby the first section is arranged closer to the edge of the fabric web at which it can curl defining with said edge a first, small angle and the second section following the angled or bent, respectively, section defines with said fabric edge a second, larger angle. The angled or bent, respectively, section of said flattening member or slot, respectively, is specifically important to ensure a trouble-free uncurling or flattening, respectively, of a curled-in edge of the fabric.

Preferably the angle lies within a range from 15° to 30° and the second angle lies preferably within a range from 25° to 70°. According to a preferred embodiment the first angle amounts to 25° and the second angle amounts to 55°.

The fabric guide is preferably arranged such that it uncurls or flattens, respectively, the edge section of the fabric web before it arrives at the cutting means. In case a specific fabric has an especially heavy structure still more guide means can be installed, specifically at a location behind the cutting means.

Preferably the guide means comprises in addition to the fabric web guide means a web guide means arranged at the cutting means, which secures a constantly equal distance of the cutting line of the cutting device from the fabric edge. This adds to the prevention of having to fold under and hide such variations resulting in a waste of material, which results in obtaining an aesthetically satisfactory even band or web, respectively, width along with an economic utilization of the fabric.

Preferably the web guide comprises a U-profile metal strip receiving and guiding the edge of the fabric between the legs of the U.

In order to vary the width of the web or band, respectively, the distances between the fabric guide and the cutting line as well as between the web guide and the cutting line are adjustable.

According to a preferred band cutting apparatus the fabric web is in the form of an endless hose encircling two rolls extending parallel to each other, of which rolls one is driven by common means, whereby a driven pressure roll is urged obliquely against the outer surface of the fabric web such to advance the web in axial direction of said rolls, whereby the fabric guide is arranged relative to the movement of advancement of the fabric immediately ahead of the pressure roll.

Thereby the fabric guide and the cutting means can be located at the run-up side of the driven roll, whereas a possible further fabric guide means is arranged at the run-down side of said driven roll.

The distances between fabric guide means and roll and between roll and web guide means can easily be adjusted such that a recurling of the fabric edges prior to entering into the cutting means is positively prevented.

BRIEF DESCRIPTION OF THE DRAWINGS

The present invention will be more fully understood by reference to the following detailed description thereof, when read in conjunction with the attached drawings, and wherein:

FIG. 3 is a side elevation of an embodiment of a fabric guide constructed according to the present invention; and FIGS. 4 and 5 are a front and side, respectively elevation of an embodiment of a web guide constructed in accordance to the present invention.

DETAILED DESCRIPTION OF THE PREFERRED EMBODIMENT

Figure 1:
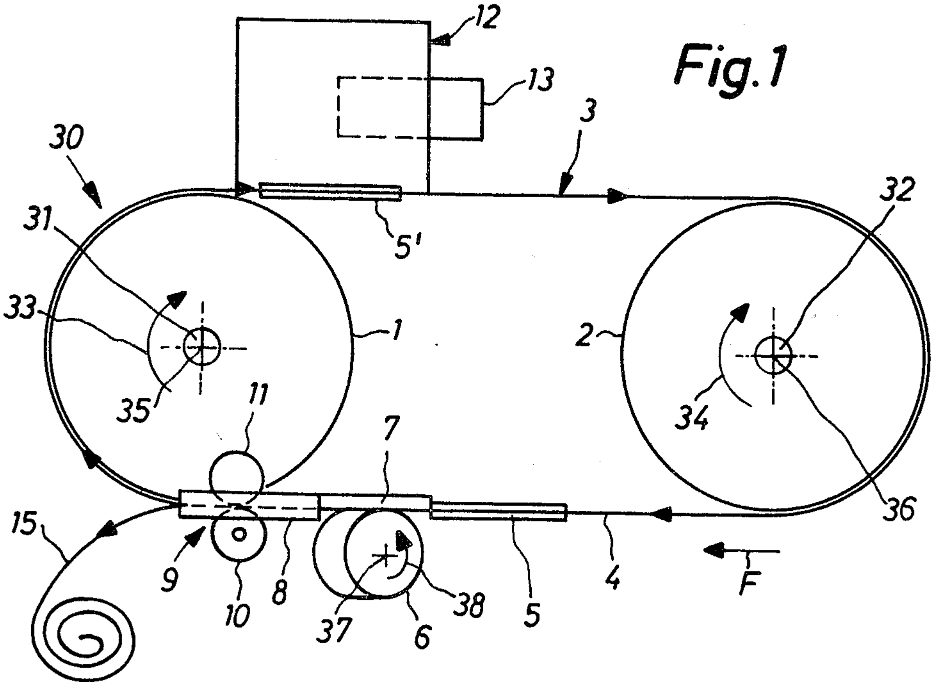
FIG. 1 is an extensively simplified schematic plan view of an embodiment of a band cutting apparatus constructed according to the present invention.
Figure 2:
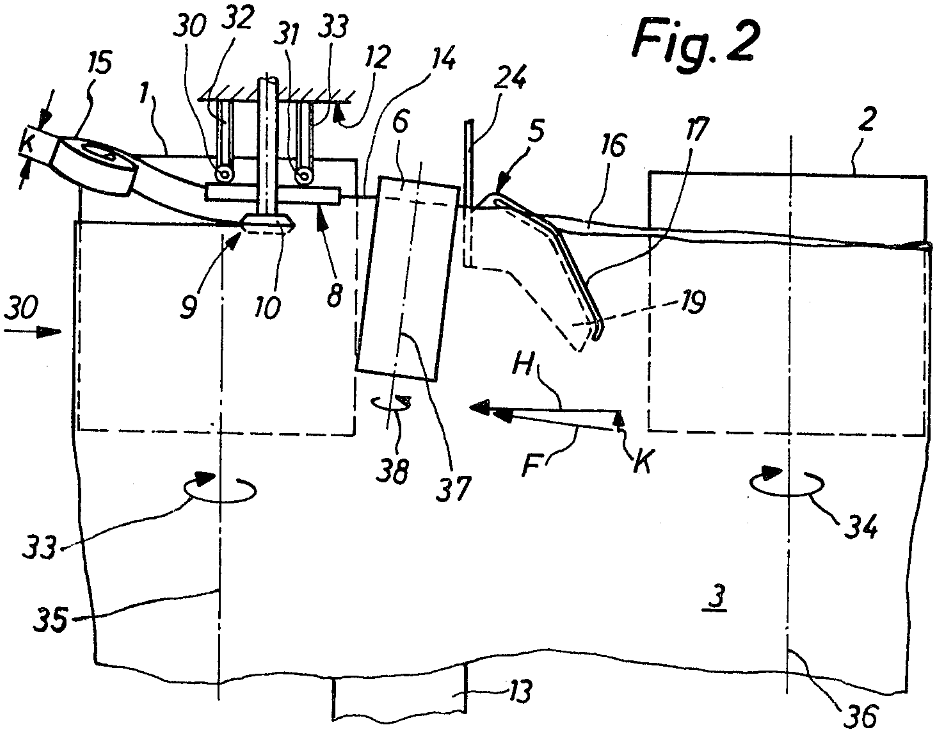
FIG. 2 is a side elevation of the band cutting apparatus shown in FIG. 1.

Describing now the drawings, and considering initially FIGS. 1 and 2, there is shown schematically a band cutting apparatus 30 comprising a first roll 1 and a second roll 2 which carry an endless, tube-like or hose-like fabric web 3 is a spread out manner. The hose-like fabric web 3 is fabricated by a conventional apparatus, such as e.g. a circular knitting machine.

The first roll 1 is mounted on a first shaft 31 driven by conventional means and the second roll 2 is mounted on a second shaft 32 which is rotatably supported. The first shaft 31 is driven such that the first roll 1 rotates in the direction of arrow 33 and obviously the second roll is rotated in the direction of the arrow 32. The direction of advance of the fabric web 3 is identified in FIGS. 1 and 2 by the arrow F, whereby it must be specifically noted, that as shown in FIG. 2 this direction of advance F defines with the axis 35 and 36 of the rolls 1 and 2, respectively, an oblique angle. Before the fabric web 3 runs up the driving roll 1 its tight strand running up said driving roll 1 passes in the direction of advance F initially a fabric guide 5, thereafter in succession a pressure roll 6 urging the fabric web 3 against a steel plate 7, whereby the pressure roll 6 is adjustably mounted with its axis 37 extending obliquely to the tight strand 4 and driven in the direction of the arrow 38 and further passes a web guide 8 which guides the fabric web 3 towards a cutting device 9 comprising a knife 10 and a counter knife 11.

At the slack strand side of the driven roll 1 there is provided a further fabric guide 5, which is designed similar to the fabric guide 5 which will be described. All these members of the band cutting apparatus 30 are mounted to the frame 12 including a support 13 of the apparatus 30.

In FIG. 2 there is disclosed, that the direction of advancement F of the fabric web 3 comprises a horizontal component H and a vertical component K. This vertical component K is achieved in that the pressure roll 6 acting upon the outer surface of the fabric web 3 is arranged with its axis 37 extending obliquely.

In FIGS. 1 and 2 there is shown at a location downstream of the cutting device 9 a web 15 having a continuous width k cut off along the upper edge 14 of the fabric. This web 15 is wound up on a conventional spindle (not shown) which is hand or machine driven.

In FIG. 2 it is shown, that the fabric edge 14 is curled inwards at a location 16 seen in the direction of advancement ahead of the entry into the fabric guide 5. This inwards curl will now be spread out by means of the fabric guide 5 shown in FIG. 3. This fabric guide 5 comprises a run-up arm 17 and a run-down arm 19. These arms 17, 19 extend substantially parallel to one another and are separated by means of a slot 18 from one another. At their upper end section a the arms 17, 19 as well as the slot 18 extend somewhat obliquely to the incoming edge 14 of the fabric, enclosing with said edge 14 a small, acute angle $\alpha$. After a bend 20 the arms 17, 19 as well as the slot 18 extend still obliquely to the edge 14, enclosing with the latter a however larger, but still acute angle $\beta$.

A preferred embodiment features the following values:

$\alpha=25°$
$\beta=55°$
a=60 mm
b=140 mm.

The above indicated angles are in no way critical and can vary to a rather large extent. In order to achieve the object the bend 20 is of importance, which object is a stretching out of the curled-in section 16 of the edge 14 of the fabric, which section is also indicated in FIG. 3. At the depicted fabric guide 5 the edge 14 of the fabric is guided in the manner shown in FIG. 2 in such a way through the slot 18, that the knife edge 21 of the narrow run-up arm 17 stretches out a possible curl at the fabric edge 14. At the opposite end of the slot 18 the fabric web 3 runs up at a knife edge 22 of the arm 19 and will be thereafter stretched out flat on a stretching plane 23 extending roughly in the plane defined by the fabric web 3. According to FIG. 2 the fabric guide 5 is laterally mounted adjustably relative to the edge 14 of the fabric by means of a bar 24, which bar 24 is mounted in a conventional (not shown) manner to the machine frame 12.

The pressure roll 6 is mounted immediately after the fabric guide 5 and presses the fabric web 3 including its flat stretched out edge 14 against the plate 17. Thus, a recurling of the fabric edge 14 is positively prevented. Following the pressure roll 6 the fabric web 3 is guided into the web guide 8 which is separately shown in FIGS. 4 and 5.

Accordingly, this web guide 8 comprises a sheet metal strip bent to an U-profile of a longitudinal extent c (see FIG. 5). The legs 25 and 26 of the U-profile have a varying width e and d, respectively. The web guide 8 is provided at its run-up end at its broader leg 26 with a run-up edge 27 bent outwardly. At its upper side the web guide 8 is provided with two tongs 28, 29, in which threaded bores 37 and 38, respectively, for threadingly receiving set screws 30, 31 (FIG. 2) are arranged, by means of which the web guide 8 can be vertically adjusted in guides 32, 33 in a direction laterally to the edge 14 of the fabric. By means of these set screws 30, 31 the web guide 8 can be adjusted relative to the cutting edges of the knives 10, 11 such that a predetermined width of the web produced thereby is achieved.

The described web guide 8 is arranged immediately following the pressure roll 6 such that it is prevented or not possible that the edge 14 of the fabric can curl back prior to its entry into the web guide 8.

Accordingly, by means of the described arrangement it is achieved that the fabric lies flatly between plate 7 and pressure roll 6. This allows an easy cutting of the fabric and a trouble free circulation thereof around the rolls 1 and 2. In order to prevent a curling-in of the edge also at the slack strand side shown at the upper portion of FIG. 1 there is arranged in the direction of advancement of the fabric immediately after the driven roll 1 a further fabric guide 5' which is designed in the same manner as the fabric guide 5. Therewith a restraint of the rotation of the fabric due to a forming of an in several layers curled fabric edge is positively prevented.

The section 39 of the fabric guides 5, 5' which is remote from the fabric edge 14 and extending more obliquely relative to the fabric edge 14 effects mainly that the fabric is driven or shifted into the highest position, i.e. the upper section 40 of the guides 5, 5' at which section 40 mainly the curling out and flattening of the curled fabric edge 14 is effected.

While there are shown and described present preferred embodiments of the invention, it is to be distinctly understood that the invention is not limited thereto, but may be otherwise variously embodied and practiced within the scope of the following claims.

ACCORDINGLY, I claim:

1. A band cutting apparatus for cutting a fabric web to produce a web-like article by the agency of a cutting means, whereby said fabric web is guided towards said cutting means, comprising a guide means including at least one fabric guide means provided with an uncurling means for uncurling an inwardly directed curl at the edge of said fabric, which fabric guide means is arranged relative to the direction of advancement of said fabric web ahead of said cutting means;

said uncurling means comprising a slot means extending obliquely and oppositely to the direction of advancement of said fabric web, said slot allowing said edge of said fabric to pass through said uncurling means;

said uncurling means also comprising two arms constituting a run-up means arm and a run-down means arm extending substantially parallel thereto whereby said two arms are separated from each other by said slot means;

and said uncurling means and said slot means respectively comprising a first section and a second section disposed at an angle to each other whereby said first section is arranged closer to the fabric edge at which the fabric can curl than the second section, and whereby said first section defines with said edge of said fabric a first small angle and said second section defines with said edge of said fabric a second, larger angle.

2. The band cutting apparatus as defined in claim 1 wherein said slot means extends obliquely at an acute angle oppositely to the direction of advancement of said fabric web.

3. The band cutting apparatus as defined in claim 2 wherein said run-down arm comprises a flattening plane means extending in a plane defined by said fabric web.

4. The band cutting apparatus as defined in claim 1 wherein said first angle lies in a range between 15° and 30° and said second angle lies in a range between 45° and 70°.

5. The band cutting apparatus as defined in claim 1, whereby said fabric web is an endless hose-like article, wherein seen in the direction of advancement of said fabric web a further similar guide means is arranged after the cutting means.

6. The band cutting machine as defined in claim 1, wherein said guide means comprises a web guide means arranged adjacent to the cutting means warranting continuously an equal distance between the cutting line of said cutting means and said edge of the fabric.

7. The band cutting apparatus as defined in claim 6, wherein said web guide means comprises a metal strip having an U-like cross-section, said U-profile strip receiving and guiding said edge of said fabric web between the two legs of the U-profile.

8. The band cutting apparatus as defined in claim 6, wherein the distance of said fabric web guide means from the cutting line is adjustable.

9. The band cutting apparatus as defined in claim 1, comprising two roll means, the axis of which extending parallel to each other, whereby one of said roll means is a driven roll means, and comprising further a pressure roll means, the axis of which extending obliquely to said two roll means, whereby said fabric web comprises the form of an endless hose encircling said two roll means and said pressure roll means is in abutment with the outer surface of said fabric web exerting a pressure thereon such to advance said fabric web axially of said roll means, and whereby said guide means is located with reference to the direction of advancement of said fabric web immediately ahead of said pressure roll means and said cutting means correspondingly immediately after said pressure roll means.

10. The band cutting apparatus as defined in claim 9, wherein said guide means and said cutting means are arranged at the run-up side of said driven roll means and wherein a further guide means is arranged at the run-down side of said driven roll.

* * * * *